United States Patent [19]

Jermo

[11] Patent Number: 5,525,194
[45] Date of Patent: Jun. 11, 1996

[54] EXTENDED NIP PRESS BELT

[75] Inventor: Olli A. Jermo, Tampere, Finland

[73] Assignee: Tamfelt Corp., Tampere, Finland

[21] Appl. No.: 231,375

[22] Filed: Apr. 22, 1994

[51] Int. Cl.⁶ .................................................. D21F 3/02
[52] U.S. Cl. .................. 162/358.4; 162/901; 198/847
[58] Field of Search ................... 162/358.4, 901; 198/847

[56] References Cited

U.S. PATENT DOCUMENTS

| | | | |
|---|---|---|---|
| 2,793,150 | 5/1957 | Deaves | 198/847 |
| 3,498,684 | 3/1970 | Hallaman | 198/847 |
| 3,900,627 | 8/1975 | Angioletti et al. | 198/847 |
| 4,229,254 | 10/1980 | Gill | 162/358.4 |
| 4,238,287 | 12/1980 | Gill | 162/358.4 |
| 4,880,501 | 11/1989 | Schiel | 162/358.4 |
| 5,062,924 | 11/1991 | McCarten et al. | 162/358.4 |
| 5,118,391 | 6/1992 | Matuscheyk et al. | 162/358.4 |
| 5,134,010 | 7/1992 | Schiel | 428/113 |
| 5,175,037 | 12/1992 | Merckens et al. | 162/901 |
| 5,238,537 | 8/1993 | Dutt | 162/358.4 |

FOREIGN PATENT DOCUMENTS 2557025  6/1977  Germany ................ 198/847

*Primary Examiner*—Karen M. Hastings
*Attorney, Agent, or Firm*—Salter & Michaelson

[57]  ABSTRACT

A press belt in the form of an endless loop includes crosswise and lengthwise reinforcing fibers. The crosswise reinforcing fibers are positioned adjacent to the outside surface of the belt and the lengthwise reinforcing fibers are positioned adjacent to the inside surface of the belt. The fibers are laid inside a casting cylinder and an elastomeric material is cast onto the fibers while the casting cylinder is rotating. The crosswise fibers are laid into the casting cylinder first so that they are adjacent to the outer surface of the belt and then the lengthwise fibers are laid over the crosswise fibers.

1 Claim, 6 Drawing Sheets

EXTENDED NIP PRESS BELT

BACKGROUND AND SUMMARY OF THE INVENTION

The instant invention relates to an endless loop press belt construction, and further relates to a method of manufacturing the press belt.

Press belts are used in various press devices, such as shoe-type presses, as used in paper making machines and calendars, to transport a continuous fabric, web or sheet through a press nip.

The prior art press belts typically comprise a base weave which is covered on both sides and impregnated with a rubber or polyurethane material. The base weave acts as a reinforcing material to add strength to the belt. In this regard, U.S. Pat. Nos. 5,238,537 and 5,134,010 represent the closest prior art to the subject invention of which the applicant is aware. U.S. Pat. No. 5,238,537 describes a belt construction wherein the reinforcement material consists of a woven paper machine fabric which is impregnated from one side with polyurethane material. It has been found that this press belt is difficult to manufacture because it requires the woven reinforcing material to be dimensionally accurate so that the resulting belt is formed in exact dimensions. Furthermore, the resulting belt exhibits only limited elasticity. Accordingly, it does not readily withstand the flexing which occurs while running through the press. The belt is therefore subject to significant wear and must be replaced often. U.S. Pat. No. 5,134,010 discloses a press belt which is constructed on the outside of a casting cylinder. The press belt is formed by first laying a plurality of crosswise reinforcement yarns, under tension, at a distance from the outside of a casting form, and then helically winding a lengthwise reinforcement yarn around the crosswise yarns so as to provide reinforcement yarns running in both directions. Elastomeric material is then fed over the yarn layers and onto the outside of the casting form through a nozzle. Braces are used to support the crosswise yarns while the elastomeric material is fed by the nozzle. It can be seen that the crosswise yarns are situated adjacent the inner surface of the belt, and that the lengthwise yarns are situated adjacent the outside surface of the belt. While this particular method of manufacture is effective, it has been found that the method is unduly cumbersome because a complicated device is required to helically wind the lengthwise yarn on top of the crosswise yarns. In addition, a complicated nozzle construction is required, which makes the casting process difficult. Furthermore, it has been found that the resulting belt is not elastic enough to withstand the repeated flexing in the press because the outer layer of helically wound yarn causes the inner crosswise yarns to press together. The result is that the crosswise yarns resisting flexing as the belt moves through the sharp transition from the loop onto the concave surface of the press-shoe. Accordingly, the belt tends to wear very quickly and must be replaced often.

The instant invention provides a press belt consisting of separate layers of crosswise and lengthwise reinforcing yarns laid on top of each other and enclosed in elastomeric material. In contrast with the prior art, the crosswise yarns of the instant press belt are located adjacent to the outside surface of the press belt and the lengthwise yarns are located adjacent to the inside surface of the press belt. This arrangement of the yarns provides the proper tensile strength while retaining the elasticity required for use in shoe-type pressing devices. Since the crosswise yarns are adjacent the outside surface of the belt, they do not tend to offer any resistance as the belt is run through the sharp transition curve from the belt loop to the concave press shoe. The instant press belt is formed by a method comprising the steps of laying the crosswise yarns inside the casting cylinder, casting a surface layer of elastomeric material over the crosswise yarns, laying the lengthwise yarns onto the still wet surface layer of elastomeric material and then casting an inner layer of elastomeric material over the lengthwise yarns wherein the inner and outer layers of elastomeric material form an integral elastomeric entity which encases both the crosswise and lengthwise yarns.

Accordingly, it is an object of the instant invention to provide a press belt which is rugged and durable while maintaining the flexibility for use in a shoe-type pressing device.

It is another object to provide a press belt having crosswise reinforcing yarns located adjacent to the outside surface of the belt and lengthwise reinforcing yarns located on adjacent to the inside surface of the belt.

It is yet another object to provide a method of manufacturing a flexible press belt which is simple and inexpensive.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
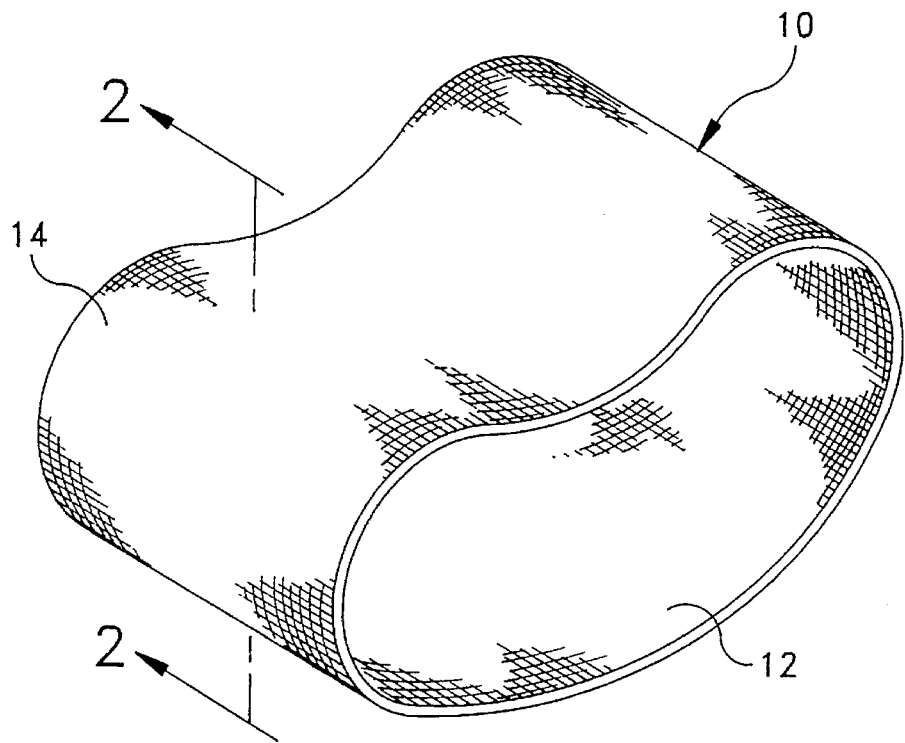
FIG. 1 is a perspective view of the endless loop press belt of the instant invention.
Figure 2:
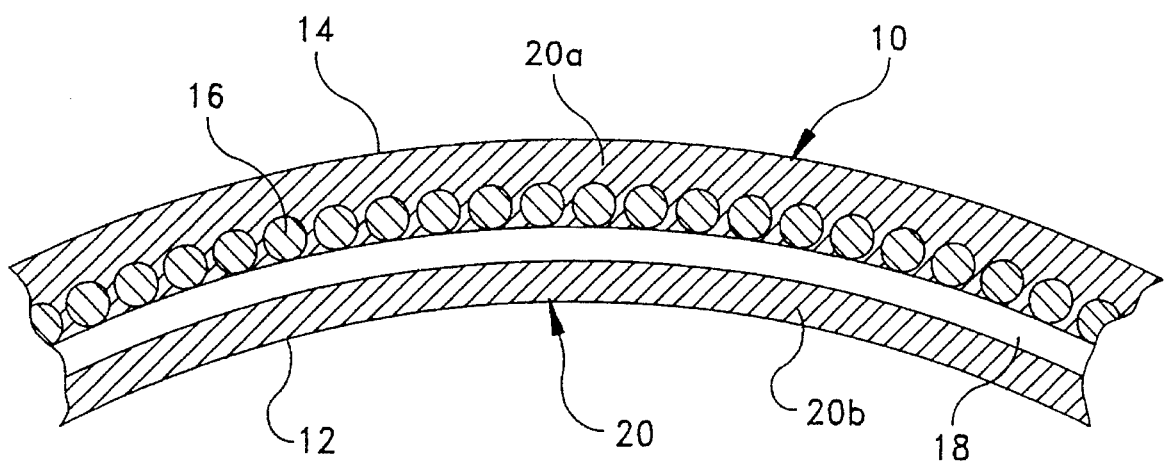
FIG. 2 is a cross-sectional view taken along line 2—2 in FIG. 1.
Figure 7:
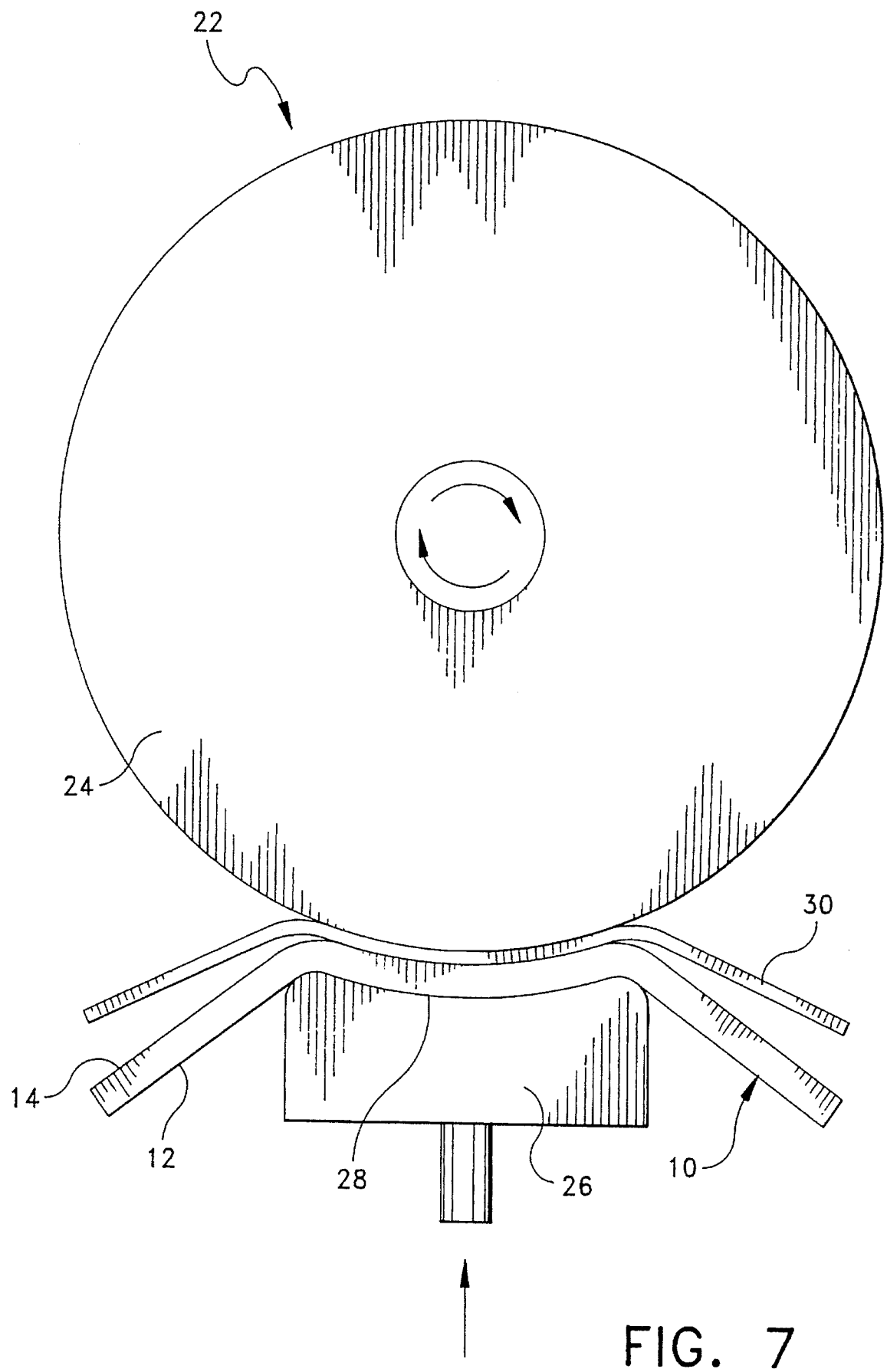
FIG. 7 is an elevational view of a shoe-type pressing device.

Referring now to the drawings, the endless loop press belt of the instant invention is illustrated and generally indicated at 10 in FIGS. 1, 2, and 7. As will hereinafter be more fully described, the instant press belt 10 has a high tensile strength while retaining the necessary flexibility required for use in a shoe-type pressing device to be described hereinafter.

The press belt 10 comprises a closed, endless loop, having inner and outer surfaces 12 and 14 respectively. The press belt 10 comprises separate layers of crosswise reinforcement yarns 16 and lengthwise reinforcing yarns 18 laid on top of each other and enclosed in elastomeric material generally indicated at 20. The crosswise yarns 16 of the instant press belt 10 are located adjacent to the outer surface 14 of the press belt 10, and the lengthwise yarns 18 are located adjacent to the inside surface 12 of the press belt 10. The arrangement of the reinforcing yarns provides the press belt 10 with a high tensile strength while retaining the elasticity required for use in shoe-type pressing devices. Since the crosswise yarns 16 are adjacent to the outside surface 14 of the belt 10, they do not offer any resistance as the belt 10 is run through the sharp transition curves of a concave press shoe. The reinforcement yarns 16 and 18 can comprise either monofilament, or multifilament yarns, depending upon the particular physical requirements of the press belt. Likewise, in the same press belt 10, some of the reinforcement yarns may comprise monofilament yarns and some of the yarns may comprise multifilament yarns. The crosswise yarns 16 can be laid comparatively far from each other without substantially changing the physical characteristics of the belt. The lengthwise reinforcement yarns 18 preferably comprise a continuous yarn laid out in a helical fashion although they may comprise individual loops. There can also be varying distances between the yarn layers.

The elastomeric material 20 preferably comprises polyurethane, although other elastomeric materials are also suitable.

Figure 3:
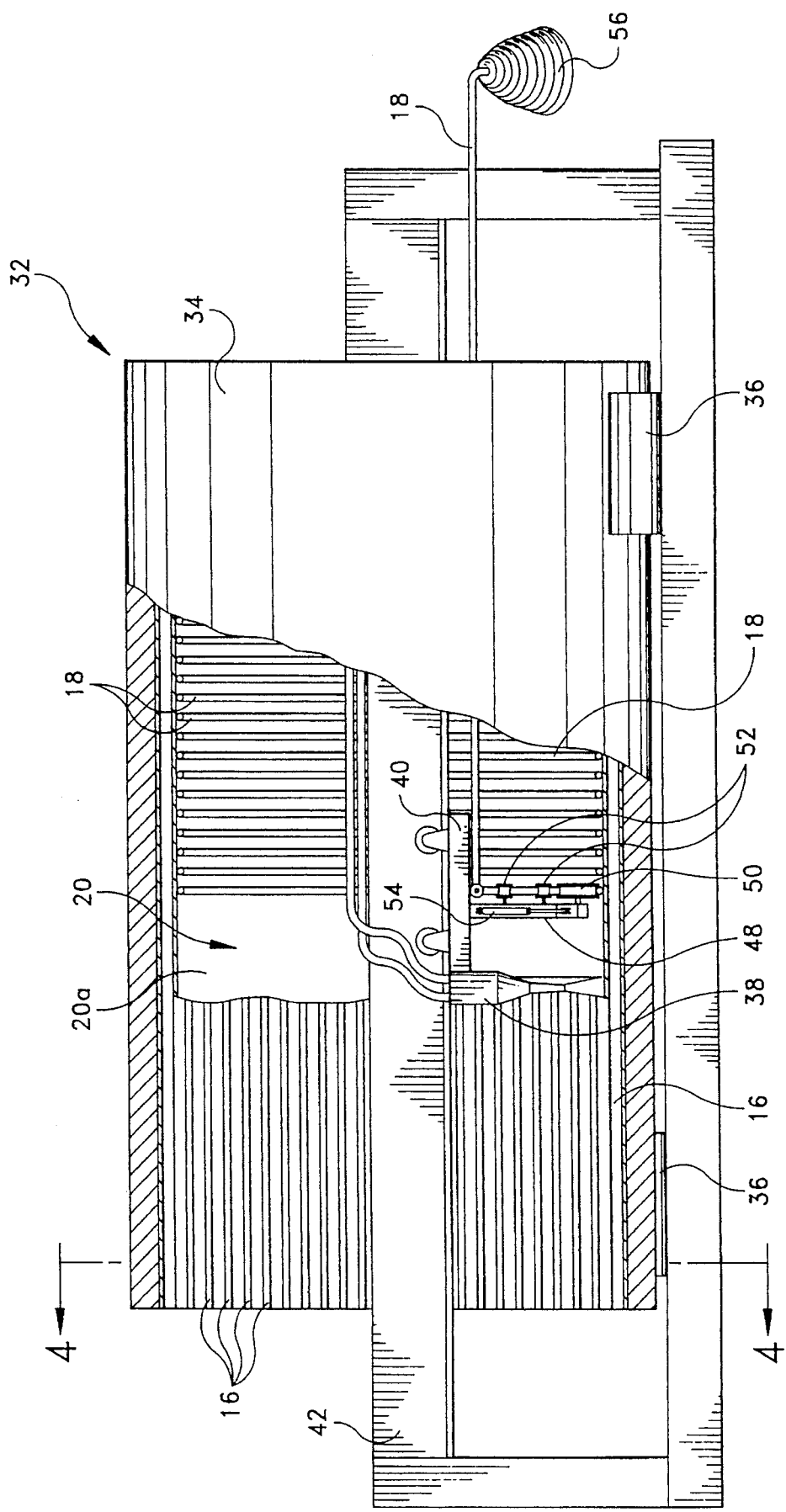
FIG. 3 is an elevational view, partially in section, of the casting apparatus for forming the press belt of the instant invention.
Figure 4:
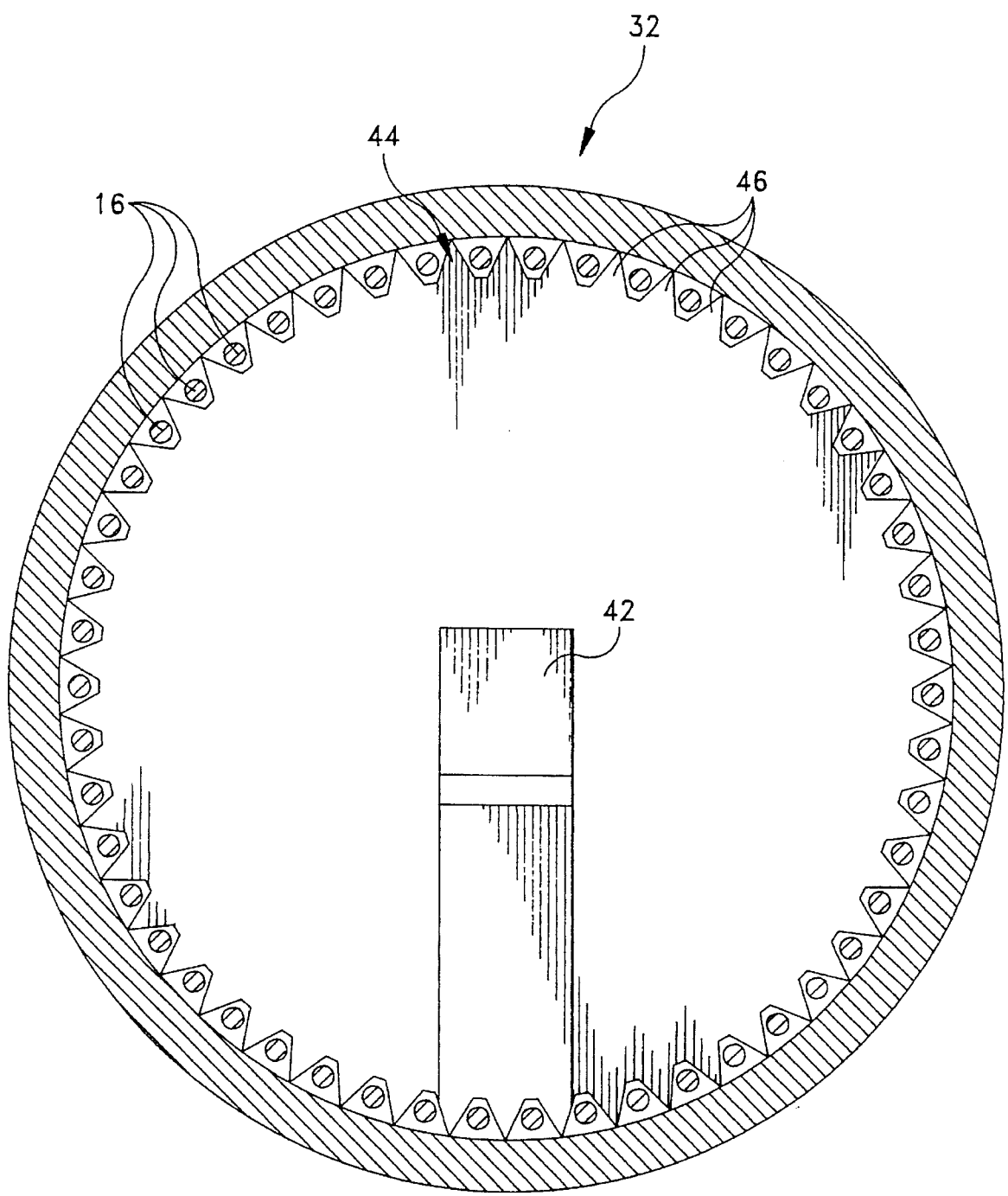
FIG. 4 is a cross-sectional view thereof taken along line 4—4 of FIG. 3.

In use (See FIG. 7), the press belt 10 is received in a shoe-type press generally indicated at 22. The shoe-type press 22 comprises a press cylinder 24 and a press shoe 26 having a concave pressing surface 28. The press cylinder 24 and press shoe 26 cooperate to form a press nip. As shown in FIG. 7, the press belt 10 is operative for transporting a continuous fabric, web or sheet 30 through the press nip. The press belt 10 passes through the nip so that inner surface 12 is received adjacent the press shoe 26. It can therefore be seen that the outer surface 14 makes contact with the sheet 30 during use. It is also pointed out that the press belt 10 isolates the sheet 30 from lubricating oil. As illustrated in FIG. 3, the reinforcement yarns 16 and 18 are spaced from each other so that the elastomeric material 20 between the yarns has sufficient space to compress when the belt 10 is bent into a concave shape against the concave surface 28 of the press shoe 26.

The instant press belt 10 is formed in a casting apparatus generally indicated at 32 in FIG. 3–6. The casting apparatus 32 comprises a casting cylinder 34 having an inside diameter which is equal to the desired outside diameter of the press belt 10. The casting cylinder 34 is mounted on supporting rollers 36 which allow the casting cylinder 34 to rotate. The reinforcement yarns 16 and 18 are laid on the inside surface of the casting cylinder 34 so that the crosswise yarns 16 are on the outside and the lengthwise yarns 18 are on the inside. As indicated earlier, the lengthwise yarns 18 may be laid in as individual loops, or as a single yarn in a helical fashion.

The polyurethane material 20 is then cast from a nozzle assembly 38 as the casting cylinder 34 rotates so as to spread the elastomeric material 20 evenly over and around the yarns 16 and 18. The nozzle assembly 38 is supported by a carriage 40 which moves axially on a support beam 42 that extends axially through the casting cylinder 34.

Figure 5:
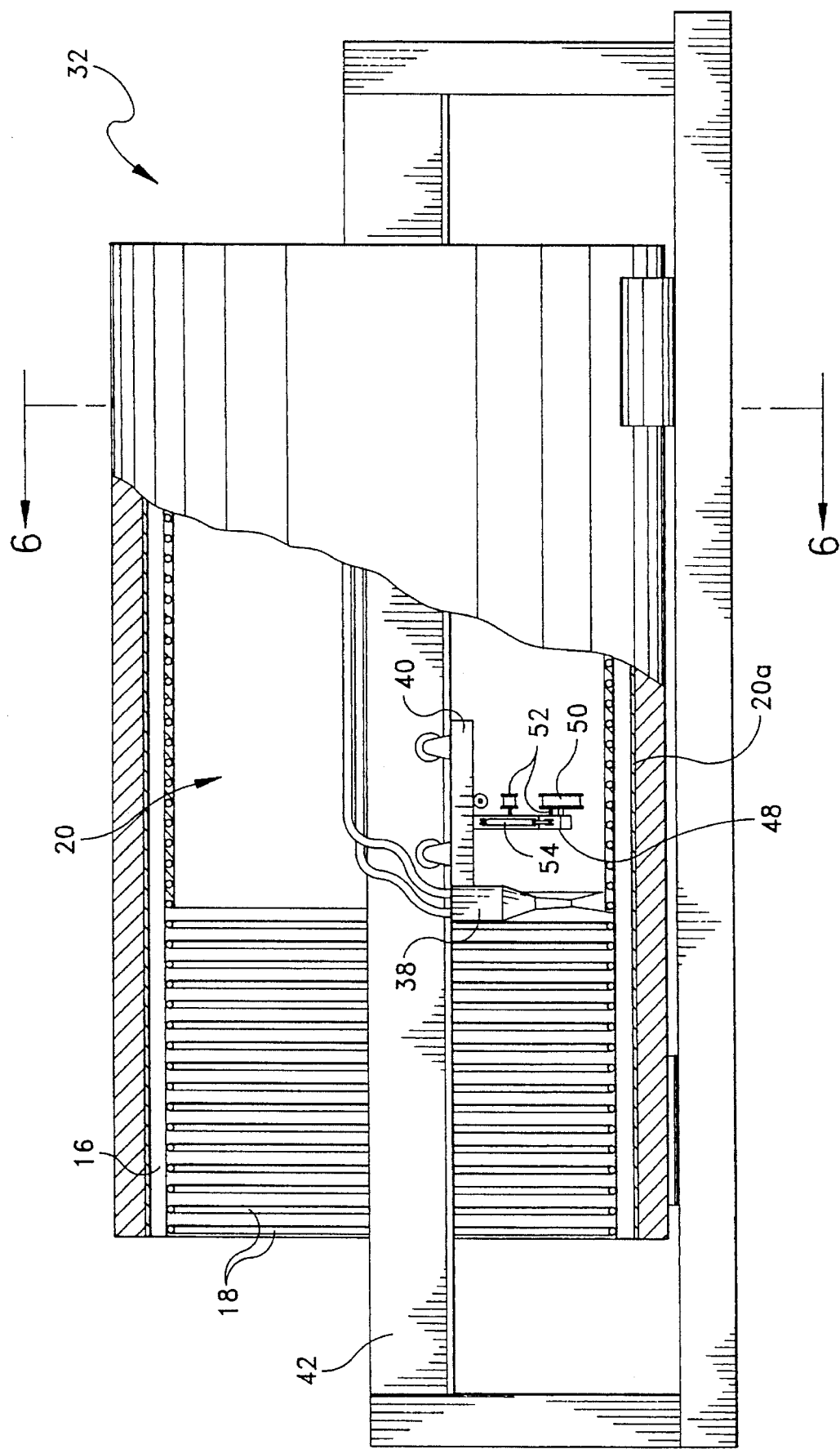
FIG. 5 is another elevational view of the casting apparatus, partially in section, with the inner layer of elastomeric material being applied.
Figure 6:
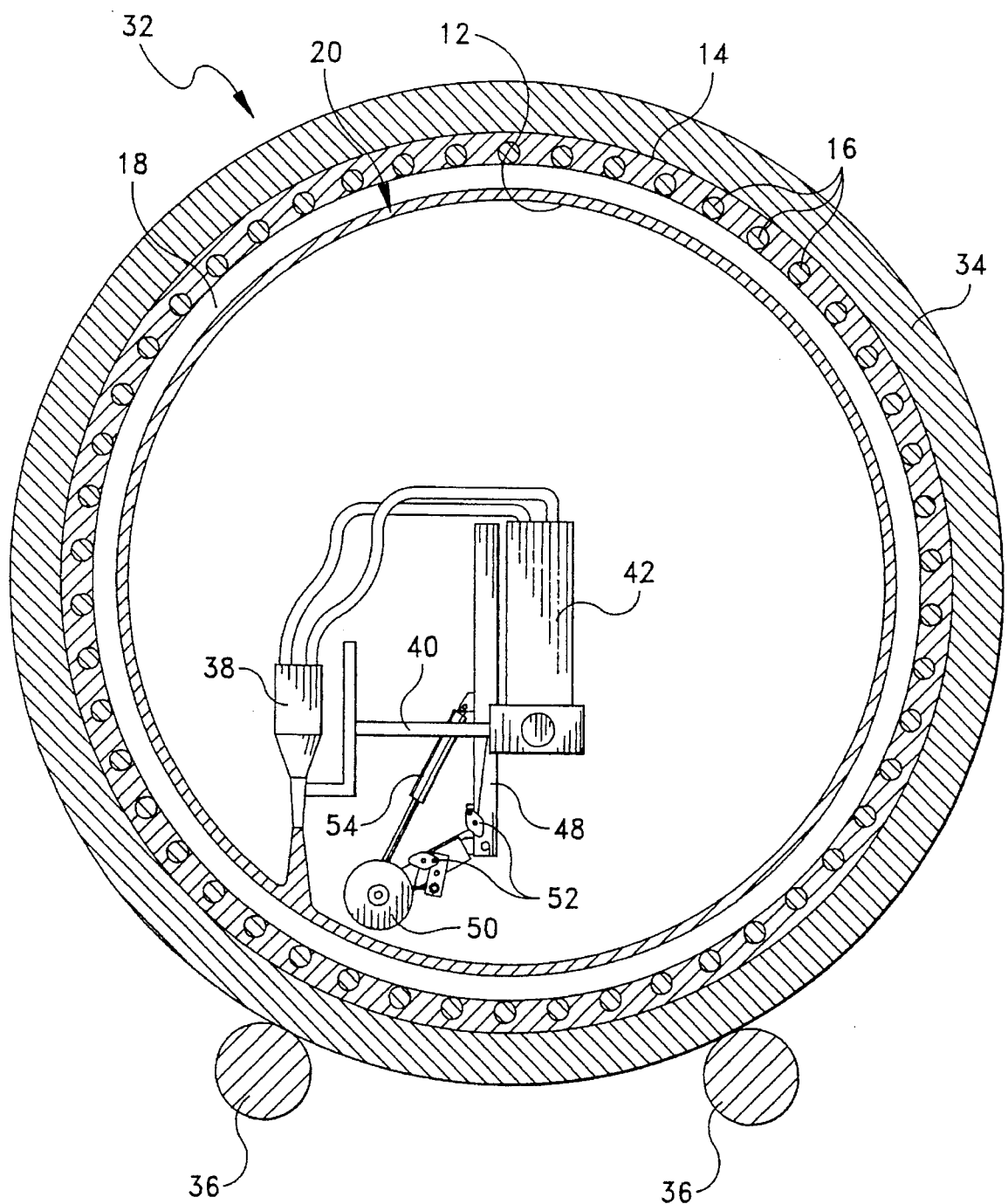
FIG. 6 is a cross-sectional view thereof taken along line 6—6 of FIG. 5.

More specifically, the preferred method of manufacturing the press belt 10 comprises the steps of suspending the crosswise yarns 16 inside the casting cylinder 34, casting an outer or surface layer of polyurethane 20a (FIG. 3) onto the crosswise yarns 16, laying the lengthwise yarns 18 in a helical configuration onto the still wet outer layer of polyurethane 20a, and then casting an inner layer of polyurethane 20b (FIG. 5) over the lengthwise yarns 18 wherein the inner and outer layers of polyurethane 20a and 20b form an integral polyurethane entity 20 which encases both the crosswise and lengthwise yarns 16 and 18. The crosswise yarns 16 are installed inside the casting cylinder 34 before any casting of the polyurethane takes place. In this connection, the crosswise yarns 16 are installed on circular steel plates 44 (FIG. 4) having a plurality of radial teeth 46 on an inner edge thereof. The steel rings 44 are installed on each end of the casting cylinder 34 and the crosswise threads 16 are threaded between the teeth 46 on each end of the casting cylinder 34 and tied to the teeth 46 where needed. A spacer (not shown) may be inserted between the surface of the cylinder 34 and the cross-wise yarns 16 to lift then off the surface. Alternatively, the teeth 46 of the plates 44 can also act as spacers. Preferably, the lengthwise reinforcing yarn 18 is wound on the inside of the casting cylinder 34 simultaneously as the first urethane layer 20a is cast (see FIG. 3). A jointed arm 48 carrying a wheel 50 and guides 62 for the lengthwise yarn 18 is installed on the same carrier 40 as the polyurethane casting head 38, trailing the casting head 38 at a predetermined distance. The arm 48 can be lowered onto the surface of the casting cylinder 34 and lifted clear off the same by means of a double-acting pneumatic cylinder 54. As soon as the urethane components are mixed together and the mixture is cast onto the cylinder 34, it begins to cure. After a certain period of time it is sufficiently cured so it will not stick to the wheel 50 is lowered to the urethane surface and with sufficient pressure it presses the yarn 18 into the urethane. The crosswise yarns 16 (inserted into the form before casting) and the urethane layer 20a determine the distance of the helically wound yarn 18 from the casting cylinder surface. After the insertion of the lengthwise yarn 18 another layer of urethane 20b is cast either from a second, trailing casting head (not shown) or from the same head 40 making another pass (FIG. 5). The two layers of polyurethane 20a and 20b cure together into one homogenous urethane layer 20 if the second layer is cast soon enough after the first. The yarn supply 56 for the winding is located outside the form and the yarn 18 is guided to the location through a set of guides 52 and rollers 56 (FIG. 3).

It can therefore be seen that the instant invention provides a unique press belt 10 and method for manufacturing the press belt 10. The press belt 10 comprises separate layers of crosswise and lengthwise reinforcing yarns 16 and 18 encased in an elastomeric entity 20. The belt 10 is constructed so that the crosswise yarns 16 are adjacent to the outside surface 12 of the belt 10 and the lengthwise yarns 18 are adjacent to the inside surface 14 of the belt 10. This arrangement of the yarns provides high tensile strength while retaining the flexibility necessary for use in a shoe-type pressing device. The method for manufacturing the belt 10 is simple and economical comprising the steps of laying the reinforcement yarns 16 and 18 inside a casting cylinder 34 and casting a layer of elastomeric material 20 over the yarns. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. An endless loop press belt in an extended nip press including a press shoe and a press roller, said press roller having a turning axis, said press belt consisting of a plurality of monofilament and/or multifilament reinforcing yarns encased in an elastomeric body by means of a casting process, said elastomeric body having an inner surface which is received adjacent to the press shoe and an outer surface received adjacent to the press roller, said plurality of reinforcing yarns consisting of an outer non-woven yarn layer disposed adjacent to said outer surface of said press belt, and a separate inner non-woven yarn layer disposed adjacent to said inner surface of said press belt, said outer yarn layer consisting of a plurality of spaced parallel yarns extending in a crosswise direction parallel to the turning axis of the press roller, said inner yarn layer consisting of a plurality of spaced parallel yarns extending in a lengthwise running direction perpendicular to the turning axis of the press roller, said inner and outer layers of yarns cooperating to provide high tensile strength, while retaining the elasticity required for use in the extended nip press.

\* \* \* \* \*